Patented June 15, 1954

2,681,287

UNITED STATES PATENT OFFICE 2,681,287

PREPARATION FOR CURING MEAT

Raymond H. Starr, Kansas City, Mo.

No Drawing. Application July 28, 1950,
Serial No. 176,513

5 Claims. (Cl. 99—222)

This invention relates to a method of and preparation for treating meat products such as ham, bacon, beef, tongue, poultry, hides and the like to effect curing and/or pickling thereof.

It has been common practice for meat packing industries to cure or pickle meats and the like by treatment of the animal tissues with sodium chloride (common salt) used alone or with small quantities of nitrate and/or nitrite of soda or potash which give a further desirable effect upon the preservation and color of the cured products. Certain sugars and flavoring materials can be added to the salts for influencing the flavor of the meats and for providing a culture medium for certain desirable bacteria.

Such curing materials are used in a variety of ways; for example, by rubbing the dry salts into the flesh and allowing the chemicals to dissolve gradually into the fluids of the tissues. Another method consists of soaking the meats in strong aqueous solutions of the materials. Often, strong aqueous solutions of the curing materials are injected under pressure into the flesh and arteries prior to soaking or rubbing the flesh as described.

A considerable time is required for the preservative action of the curing chemicals to be effective under any of these methods; consequently, it is necessary to maintain the flesh tissues at a temperature in the neighborhood of 38° F. to inhibit putrefaction. During the ordinary curing process undesirable fluctuations take place in the degree of acidity of the fluid solution and of the fluids within the flesh.

The principal objects of the present invention are to provide a method of treating various flesh tissues to accelerate penetration of common salt and common salt mixtures and solutions thereby reducing the time normally required for curing or pickling; to maintain in the salt solution during the curing or pickling process a constant degree of acidity; to reduce the costs of refrigeration during the curing process by permitting storage at higher than normal refrigeration temperature; and to effect catalysis of the chemical reactions taking place during the curing process.

It is a further object of the invention to provide an improved treating mixture or solution.

In carrying out the present invention I have discovered an accelerator which, when combined with sodium chloride, accelerates penetration of the sodium chloride and other chemicals into the animal tissues thereby reducing the time required for penetration by approximately one-half the normal period required for effectively curing and pickling meat tissues. I have also discovered that the accelerator serves as a catalyst and also forms a buffer which maintains a stable acidity within the treating fluids surrounding and within the animal tissues.

The accelerator is formed during treatment of the meat through the addition to sodium chloride of a small quantity of a weak edible acid along with a larger quantity of a soluble, edible, ionizable salt of the same weak edible acid; the edible acid being one which has the property of reacting with the edible salt to form a complex salt or metallic-acid ion in solution, said ion serving as the accelerator to speed penetration of the sodium chloride and other salts into the animal tissues. The metallic-acid ion also acts as a buffer and stabilizes the acidity of the solution at a pH value between 5.8 and 6.3.

The specific acid and ionizable salt which form the desired accelerator and buffer are lactic acid and hydrated calcium lactate respectively. To attain the best results, the hydrated calcium lactate is used in proportion of about 1/7 of the weight of the sodium chloride used, since sodium chloride is approximately seven times as soluble in water as the calcium lactate; and it is desirable to have strong or saturated solutions of the sodium chloride and the calcium lactate. The amount of lactic acid used is sufficient to render the solution definitely acid in reaction and is in the form of 85% solution in the amount of approximately 1/20 of the weight of the hydrated calcium lactate employed. The chemicals may also include nitrates and nitrites of sodium or potassium along with sugars and flavoring substances in correct amounts to give the desired flavors.

One curing preparation that is highly satisfactory is as follows:

| | Percent |
|---|---|
| Sodium chloride | 79.7 |
| Hydrated calcium lactate | 12.7 |
| 85% lactic acid | .6 |
| Cane sugar | 5.2 |
| Sodium nitrate | 1.0 |
| Sodium nitrite | .8 |

The percentage of calcium lactate in the mixture could be reduced from 13 to 8% by weight and the lactic acid could be decreased from .7% to .5% by weight without greatly reducing the speed of curing.

It is also to be understood that nitrate and nitrite of potassium could be substituted in the above formula for corresponding sodium salts without influencing the speed of curing.

The foregoing mixture can be used for curing meat or other animal products by rubbing the dry salts onto the surface thereof and/or soaking the products in a saturated solution of the chemicals. The chemical mixtures might also be injected into the flesh and arteries of the meat. In addition, the mixture may be rubbed on the outer surfaces or the meats may be soaked in a solution of the mixture.

Another preparation which may be used is as follows:

| | Percent |
|---|---|
| Sodium chloride | 87 |
| Hydrated calcium lactate | 12.4 |
| 85% lactic acid | .6 |

In using the mixtures the lactic acid reacts with the calcium lactate to form a complex metallic ion $Ca(C_3H_5O_3)$ which serves as an accelerator and catalyst in speeding up the curing process. Also the ion thus formed serves as a buffer to maintain the acidity of the liquids at a pH value between 5.8 and 6.3 throughout the curing time.

The curing time is shortened to about one-half of the normal curing time and better products are provided. The curing process may also be carried out at a temperature 10° Fahrenheit warmer than the usual temperatures. The shorter curing time also results in considerable saving in refrigeration costs.

It is to be understood that the preparation for curing flesh tissues may be supplied in the form of the individual chemicals as above noted, or the hydrated calcium lactate may be reacted with the lactic acid to produce a complex salt which may be substituted for the lactic acid and calcium lactate in the above formula.

What I claim and desire to secure by Letters Patent is:

1. A meat curing preparation including, sodium chloride and accelerator forming materials for accelerating penetration of the sodium chloride into meat to shorten the curing time wherein said accelerator forming materials consist of lactic acid and calcium lactate.

2. A meat curing preparation including, sodium chloride and accelerator forming materials for accelerating penetration of the sodium chloride into the meat to shorten the curing time wherein said materials consist of hydrated calcium lactate and lactic acid, the sodium chloride and hydrated calcium lactate being in the proportions of approximately their respective solubilities in water, and the lactic acid equal in weight to approximately 1/20 of the calcium lactate.

3. A meat curing preparation containing sodium chloride, lactic acid and calcium lactate, the metallic radical of the calcium lactate forming with the lactic acid a complex ion possessing the ability to buffer acidity between the limits pH 5.8 and pH 6.3 in a strong aqueous solution, and to accelerate the curing time of the sodium chloride.

4. A method of curing meat consisting of treating the meat with a mixture of curing salts containing a complex calcium lactate ion resulting from the reaction of lactic acid and calcium lactate.

5. The method of curing meat including treating the meat with a mixture of curing salts while maintaining the acidity present between pH 5.8 and pH 6.3 by utilizing a buffer formed by the reaction of lactic acid with calcium lactate.

References Cited in the file of this patent

UNITED STATES PATENTS

| Number | Name | Date |
|---|---|---|
| 2,117,478 | Hall | May 17, 1938 |
| 2,513,094 | Hall | June 27, 1950 |